(12) United States Patent
Ogata et al.

(10) Patent No.: US 7,708,824 B2
(45) Date of Patent: May 4, 2010

(54) C. I. PIGMENT RED 57:1 AND PRODUCTION PROCESS THEREOF

(75) Inventors: Akihiro Ogata, Kamisu (JP); Nagatoshi Kobayashi, Kamisu (JP); Keiko Otsubo, Kamisu (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/158,399

(22) PCT Filed: Jun. 4, 2007

(86) PCT No.: PCT/JP2007/061292

§ 371 (c)(1),
(2), (4) Date: Jun. 20, 2008

(87) PCT Pub. No.: WO2007/142191

PCT Pub. Date: Dec. 13, 2007

(65) Prior Publication Data

US 2009/0101043 A1    Apr. 23, 2009

(30) Foreign Application Priority Data

Jun. 2, 2006    (JP) ................ 2006-154616

(51) Int. Cl.
C09B 29/15    (2006.01)
C09B 41/00    (2006.01)
C09B 63/00    (2006.01)

(52) U.S. Cl. ............ 106/496; 534/573; 534/579; 534/581; 366/293

(58) Field of Classification Search ............ 106/496; 534/573, 579, 581; 366/293
See application file for complete search history.

(56) References Cited

U.S. PATENT DOCUMENTS 2,478,768 A * 8/1949 Locke .............. 534/579
4,190,578 A * 2/1980 Hamilton et al. ...... 534/841

FOREIGN PATENT DOCUMENTS

| GB | 2129434 A | * | 5/1985 |
| JP | 59-86660 A | | 5/1984 |
| JP | 2002-338841 A | | 11/2002 |
| JP | 2002-356641 A | | 12/2002 |
| JP | 2002-356641 A | * | 12/2002 |
| JP | 2005-154701 A | | 6/2005 |
| JP | 2006-063306 A | | 3/2006 |
| WO | 2005/097914 A1 | | 10/2005 |

OTHER PUBLICATIONS

Derwent-Acc-No: 1992-226730, abstract of German Patent Specification No. DD298256A5 (Feb. 1992).*
European Search Report dated Dec. 19, 2008, issued in corresponding European Patent Application No. 07767040.4.
International Search Report of PCT/JP2007/061292; date of mailing Sep. 4, 2007.

* cited by examiner

*Primary Examiner*—Anthony J Green
(74) *Attorney, Agent, or Firm*—Westerman, Hattori, Daniels & Adrian, LLP

(57) ABSTRACT

In C. I. pigment red 57:1 of the present invention, the total content of 3-hydroxy-2-naphthoic acid and a metal salt thereof, which is measured by quantitative analysis using liquid chromatography, is 2,500 ppm or less as converted into the 3-hydroxy-2-naphthoic acid.

2 Claims, 2 Drawing Sheets

C. I. PIGMENT RED 57:1 AND PRODUCTION PROCESS THEREOF

TECHNICAL FIELD

The present invention relates to C. I. pigment red 57:1 and a production process thereof, which contains smaller quantities of 3-hydroxy-2-naphthoic acid and a metal salt thereof than those in conventional ones.

BACKGROUND ART

C. I. pigment red 57:1 is a red pigment containing calcium bis[2-(3-carboxy-2-hydroxynaphthylazo)-5-methylbenzenesulfonate] as an essential component. This C. I. pigment red 57:1 is produced by coupling a diazonium salt of 4-aminotoluene-3-sulfonic acid and 3-hydroxy-2-naphthoic acid to thereby obtain an azo dye, and then laking this azo dye with an inorganic calcium compound (See Patent References 1 and 2).

The reaction ratio in obtaining a diazonium salt of 4-aminotoluene-3-sulfonic acid is 98% or more, and is almost stoichiometrically determined regardless of agitating efficiency and the performance of an agitator. Therefore, the molar ratio of a diazonium salt of 4-aminotoluene-3-sulfonic acid and 3-hydroxy-2-naphthoic acid, which are supplied as raw materials to obtain an azo dye, can be described as 4-aminotoluene-3-sulfonic acid: 3-hydroxy-2-naphthoic acid (molar ratio). Although the stoichiometric molar ratio of the both compounds is 1:1 in the coupling reaction, in consideration of agitating efficiency, the performance of an agitator, and the reaction ratio of a coupler and a base, it has been general to supply raw materials so that the actual molar ratio of 3-hydroxy-2-naphthoic acid exceeds the stoichiometric one by 0.7 to 5 mol %.

However, the present inventors have found that the unreacted 3-hydroxy-2-naphthoic acid remains in an azo dye despite the intention even though the reaction is conducted by supplying the raw materials in the aforementioned manner. In C. I. pigment red 57:1 obtained by laking without knowing the remaining 3-hydroxy-2-naphthoic acid, 3-hydroxy-2-naphthoic acid and metal salts thereof are naturally contaminated as impurities at relatively high concentrations, and these impurities are hard to be removed by washing, etc. Moreover, 3-hydroxy-2-naphthoic acid is produced when metal salts of 3-hydroxy-2-naphthoic acid are contacted with a strong acid for some reasons.

Recently, the 3-hydroxy-2-naphthoic acid have been recognized as a chemical compound having mutagenicity, and for example, a guideline for preventing a health problem on exposure to it has been published in the work in which a customer, etc. deals with it. Accordingly, the extinction or the concentration reduction of free 3-hydroxy-2-naphthoic acid begins to be expected. In specific, it is desired that 3-hydroxy-2-naphthoic acid and salts thereof are not eluted to a waste solution, for example in the case where a base ink for a printing ink is prepared by flushing of a pigment press-cake of C. I. pigment red 57:1 with a varnish.

In a large-scale production of a pigment itself, from the viewpoint of the security of working environment, it is desired that 3-hydroxy-2-naphthoic acid and salts thereof are not flowed out from C. I. pigment red 57:1 as a waste solution when raw materials are supplied, when an azo dye is produced by the coupling reaction as an intermediate, and when an effluent treatment is conducted in the stage before being provided for a customer.

[Patent Reference 1]
Japanese Unexamined Patent Application, First Publication No. 2002-338841
[Patent Reference 2]
Japanese Unexamined Patent Application, First Publication No. 2006-63306

DISCLOSURE OF INVENTION

An object of the present invention it to provide C. I. pigment red 57:1 and a production process thereof, which contains smaller quantities of 3-hydroxy-2-naphthoic acid and metal salts thereof than those in conventional ones and offers high safety of working environment.

The present inventors had intensively investigated the process that does not allow 3-hydroxy-2-naphthoic acid and metal salts thereof to remain in C. I. pigment red 57:1 of a final product to be sold for a customer as much as possible in order to contribute to the prevention of a health problem on exposure for a worker dealing with the pigment. As a result, the present inventors discovered that by suppressing the excess percentage of 3-hydroxy-2-naphthoic acid in comparison with conventional ones and conducting agitating so that 3-hydroxy-2-naphthoic acid is consumed at 100% or as a close percentage to 100% as possible, the drawbacks associated with the conventional technology described above could be resolved, and C. I. pigment red 57:1 can be provided, which contains 3-hydroxy-2-naphthoic acid at only a lower level than that in conventional ones. Therefore, the present inventors were able to complete the present invention.

In other words, the present invention provides C. I. pigment red 57:1, wherein the total content of 3-hydroxy-2-naphthoic acid and a metal salt thereof, which is measured by quantitative analysis using liquid chromatography, is 2,500 ppm or less as converted into the 3-hydroxy-2-naphthoic acid.

In addition, the present invention provides a process for producing C. I. pigment red 57:1 that include:
conducting coupling of a diazonium salt of 4-aminotoluene-3-sulfonic acid and 3-hydroxy-2-naphthoic acid; and
conducting laking with an inorganic calcium compound, wherein
the molar ratio of the 4-aminotoluene-3-sulfonic acid: the 3-hydroxy-2-naphthoic acid is set within a range of 1.000:1.000 to 1.000:1.006, and
the coupling is conducted by agitating so that the reaction ratio of the 3-hydroxy-2-naphthoic acid reaches 98.45% or more.

According to C. I. pigment red 57:1 of the present invention, the total content of 3-hydroxy-2-naphthoic acid and metal salts thereof, which is measured by quantitative analysis using liquid chromatography, is at a lower level than that in conventional ones, and therefore, the particularly significant effect can be obtained in that safety of working environment in which a customer deals with it is much high.

According to a process for producing C. I. pigment red 57:1 of the present invention, the particularly significant effects can be obtained in that the used quantity of 3-hydroxy-2-naphthoic acid that act as the raw material can be reduced by comparison at the same yield and that the pigment can be provided, which offers high safety of working environment in which a customer deals with it is much higher.

Figure 1:
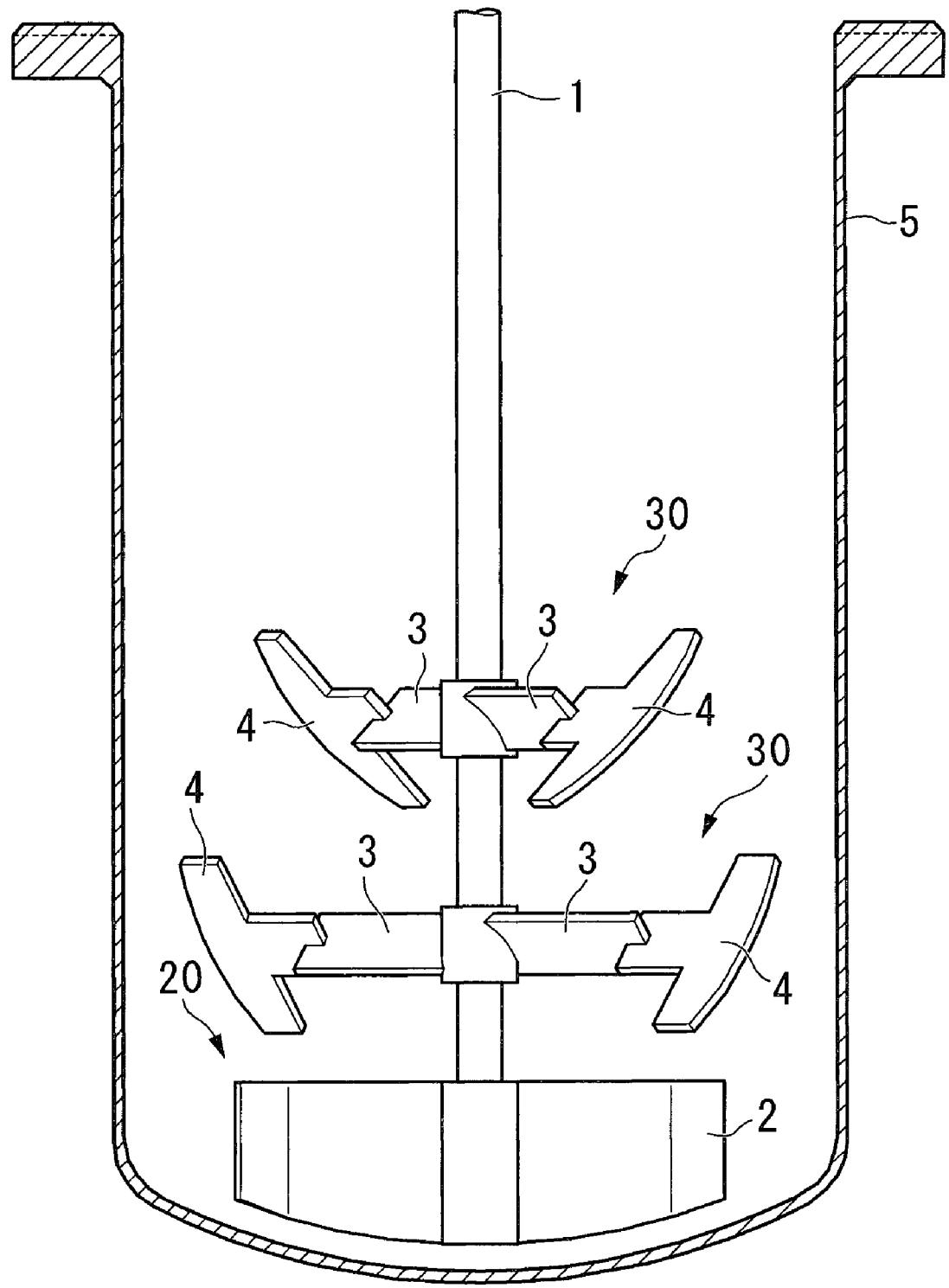
FIG. 1 is a side view of an agitator used in Examples 1 to 3.

The reference numerals shown in these figures are defined as follows:

1 represents a rotational axis; 2 represents a bottom paddle; 3 represents a paddle; 4 represents a scraper; 5 represents an agitating tank; 20 represents a main agitating blade; and 30 represents an auxiliary agitating blade.

BEST MODE FOR CARRYING OUT THE INVENTION

A more detailed description of the present invention is provided below.

C. I. pigment red 57:1 of the present invention is characterized in that the total content of 3-hydroxy-2-naphthoic acid and metal salts thereof, which is measured by quantitative analysis using liquid chromatography, is 2,500 ppm or less, and preferably 1,000 ppm or less, as converted into the 3-hydroxy-2-naphthoic acid. The term "2,500 ppm or less" means 0 to 2,500 ppm, and the term "1,000 ppm or less" means 0 to 1,000 ppm. The optimal range is 100 to 1,000 ppm. In the present invention, the total content of 3-hydroxy-2-naphthoic acid and the metal salts of 3-hydroxy-2-naphthoic acid and metals such as $Ca^{1/2+}$, $Sr^{1/2+}$, $Na^+$, and $Al^{1/3+}$ is described as the content in the case where all the metal salts are assumed to be 3-hydroxy-2-naphthoic acid. The quantitative analysis using liquid chromatography is abbreviated as liquid chromatography mass spectrometry, and the method thereof is described below.

In C.I. pigment red 57:1 of the present invention, rosins can be included according to need. By including rosins in a pigment of the present invention, printability can be much improved when the pigment was used for preparation of printing ink.

Herein, as rosins, any conventional one can be used, and examples thereof include a rosin containing abietic acid as a main component, a disproportionated rosin, a partially hydrogenated rosin, a completely hydrogenated rosin, a maleic acid-modified rosin, a fumaric acid-modified rosin, and a polymerized rosin. Rosins can be included at 3 to 30 parts, and preferably 5 to 25 parts per 100 parts by mass of calcium bis[2-(3-carboxy-2-hydroxynaphthylazo)-5-methylbenzenesulfonate].

In the present invention, as the content of 3-hydroxy-2-naphthoic acid in C. I. pigment red 57:1 is lower within a range of 2,500 ppm or less, a health problem on exposure for a worker dealing with the pigment can be prevented more. In addition, by not allowing 3-hydroxy-2-naphthoic acid and metal salts thereof to remain in C. I. pigment red 57:1 of a final product to be sold for a customer as much as possible, the safety of working environment in which a customer deals with the pigment can be much improved.

An azo dye prior to the laking of C. I. pigment red 57:1 is produced by reacting a diazonium salt of 4-aminotoluene-3-sulfonic acid that acts as a diazo component, and 3-hydroxy-2-naphthoic acid that acts as a coupler component.

In order that the total content of 3-hydroxy-2-naphthoic acid and metal salts thereof, which is measured by quantitative analysis using liquid chromatography, is reduced to 2,500 ppm or less as converted into the 3-hydroxy-2-naphthoic acid, it is preferable not to reduce 3-hydroxy-2-naphthoic acid and metal salts thereof after the pigment production, which is a symptomatic treatment and give only an insufficient effect despite a lot of workloads, but to reduce 3-hydroxy-2-naphthoic acid and metal salts thereof in the step before the pigment production.

For this reason, it is preferable that the molar ratio of a coupler component, which is conventionally supplied in large excess, be as close to the stoichiometric molar ratio as possible and that a coupler component be stirred and reacted so that the reaction ratio thereof be as close to 100% as possible in order not to allow an unreacted coupler component to remain.

C. I. pigment red 57:1 of the present invention can be produced by conducting coupling of a diazonium salt of 4-aminotoluene-3-sulfonic acid and 3-hydroxy-2-naphthoic acid; and conducting laking it with an inorganic calcium compound, in which the molar ratio of the 4-aminotoluene-3-sulfonic acid: the 3-hydroxy-2-naphthoic acid is set within a range of 1.000:1.000 to 1.000:1.006, and the coupling is conducted by agitating so that the reaction ratio of the 3-hydroxy-2-naphthoic acid reaches 98.45% or more.

As described above, in the present invention, the used quantity of 3-hydroxy-2-naphthoic acid is reduced more than before by using the molar ratio of 3-hydroxy-2-naphthoic acid supplied as a coupler component of the raw materials, which is much closer to the stoichiometric molar ratio than before as indicated by 4-aminotoluene-3-sulfonic acid: 3-hydroxy-2-naphthoic acid (molar ratio)=1.000:1.000 to 1.000:1.006, and the reaction is conducted by agitating so that the reaction ratio of 3-hydroxy-2-naphthoic acid reaches as a high value as 98.45% or more, thereby not allowing 3-hydroxy-2-naphthoic acid of an unreacted raw material to remain in the product after the coupling reaction.

In the present invention, the used quantity of 3-hydroxy-2-naphthoic acid can be reduced in the step of supplying raw materials. Therefore, when the same quantity of 3-hydroxy-2-naphthoic acid is used in an industrially large-scale production, a larger quantity of C. I. pigment red 57:1 can be produced than before, and the big contribution to the cost reduction of the pigment can be also expected.

The nature of the agitating blade provided within the agitator, which is used for conducting the agitating and mixing of liquid during the coupling reaction in the production of the azo dye that functions as a precursor to the azo lake pigment, tends to be determined independently by each manufacturer on a trial and error basis, and public documents that reveal specific structures are essentially unknown.

Examples of the agitating blades provided within the agitator used during the coupling reaction include anchor blades, turbine blades, paddle blades, Pfaudler blades, Maxblend blades (SHI Mechanical & Equipment Inc.), and Fullzone blades (Kobelco Eco-Solutions Co., Ltd.). However, in terms of agitating with less energy consumption, the following agitator is most preferable: an agitator that has a rotational axis fitted with a main agitating blade and an auxiliary agitating blade inside an agitating tank, in which the main agitating blade has tips that are separated from the inner wall surface of the agitating tank so as to generate a rising liquid current during agitating, and is positioned at the lowest point on the central axis, whereas the auxiliary agitating blade has scrapers close to the inner wall of the agitating tank that are either arranged vertically, or inclined so as to push the liquid up during rotation, and has paddles that are connected to the scrapers and are either arranged vertically, or inclined so as to push the liquid down during rotation, and vertically adjacent agitating blades are positioned so that the top edge of the lower agitating blade exhibits a phase lag relative to the bottom edge of the upper agitating blade in the opposite direction to the direction of rotation of the rotational axis.

In the present invention, the central axis refers to the rotational axis.

When the coupling reaction is conducted using the aforementioned specific agitator, the reaction may be conducted by selecting the conditions under which 98.45% or more of the supplied 3-hydroxy-2-naphthoic acid are reacted. In specific, by agitating at a required power of at least 0.1 but less than 1.0 kW/m$^3$, for a period of 5 to 60 minutes, 98.45% or more of the supplied 3-hydroxy-2-naphthoic acid can be reacted. According to the coupling reaction method using the aforementioned specific agitator, in comparison with the methods using other conventional agitators, the energy consumption described as the product of a required power and a time period can be much suppressed, and therefore, the productivity of the pigment is much improved at the same energy consumption.

The reaction ratio of 3-hydroxy-2-naphthoic acid refers to the reaction ratio which is obtained by the quantity of the 3-hydroxy-2-naphthoic acid consumed by the reaction with a diazonium salt of 4-aminotoluene-3-sulfonic acid per the quantity of the supplied 3-hydroxy-2-naphthoic acid. In C.I. pigment red 57:1, the pigment slurry prior to drying is turned into an object according to the measurement of the total content of 3-hydroxy-2-naphthoic acid and the metal salts thereof by using the quantitative analysis using liquid chromatography, and the reaction ratio is calculated by liquid chromatography mass spectrometry of 3-hydroxy-2-naphthoic acid.

The diazo component may be a diazonium salt of 4-aminotoluene-3-sulfonic acid alone, but diazonium salts of other aromatic amines including isomers and derivatives of the aforementioned aromatic amines such as 1-amino-4-methylbenzene-3-sulfonic acid and tobias acid can be included within 15 mol % of the diazo component.

Conventional processes can be used to obtain 4-aminotoluene-3-sulfonic acid and diazonium salts of other aromatic amines, and the reaction ratio (hereinafter, referred to as a diazotization ratio) is 98% or more.

The coupler component is also most preferably 3-hydroxy-2-naphthoic acid alone, but phenols and naphthols such as 2-hydroxynaphthalene can be included within 15 mol % of the coupler component.

Any conventional process can be used to obtain the corresponding aqueous solution from the coupler component, and for example, the aforementioned component may be dispersed in heated water so as to be dissolved as an alkaline.

The reaction temperature of the coupling is not restricted, but is conventionally within a range of 0° C. to 60° C., and preferably within a range of 0° C. to 40° C.

Meanwhile, the laking reaction is conducted by adding an inorganic calcium compound at the quantity corresponding to the total equivalent quantity of the sulfonic acid group, the carboxyl group, and the water-soluble salts thereof in an azo dye. In this case, from the viewpoint of the reaction ratio, etc., the aforementioned quantity can be adjusted. Calcium is a divalent metal, and therefore, in the laking reaction of the azo dye that includes two monovalent acid groups in the molecule, 1 mol of an inorganic calcium compound is stoichiometrically used for 1 mol of the azo dye. The reaction temperature of the laking is not restricted, but is conventionally within a range of 0° C. to 60° C., and preferably within a range of 0° C. to 40° C. As an inorganic calcium compound, calcium chloride can be used, for example.

The suspension including the laked pigment can be used as a pigment after being directly subjected to filtration and/or drying. Moreover, the suspension can be aged in order to arrange the particle configuration of the pigment following the pH adjustment according to need. Heating is conducted at the temperature of 60 to 90° C. for a period of 30 minutes to 2 hours.

In the aforementioned production process of C. I. pigment red 57:1, the aforementioned rosins may be added to the aqueous solution containing a coupler component, or the aqueous solution or the suspension of an azo dye according to need. Rosins can be added at the aforementioned quantity.

According to the aforementioned production method, C. I. pigment red 57:1 of the present invention can be easily obtained, in which the total content of 3-hydroxy-2-naphthoic acid and a metal salt thereof, which is measured by liquid chromatography mass spectrometry, is 2,500 ppm or less as converted into the 3-hydroxy-2-naphthoic acid.

As for C. I. pigment red 57:1 produced by the process of the present invention, the lower is the total content of 3-hydroxy-2-naphthoic acid and a metal salt thereof measured by quantitative analysis using liquid chromatography, the higher can be the safety of working environment.

As for C. I. pigment red 57:1 produced by the process of the present invention, 3-hydroxy-2-naphthoic acid and salts thereof are not flowed out from C. I. pigment red 57:1 as a waste solution when an effluent treatment is conducted in the stage before being provided for a customer. Therefore, the ink can be obtained, which has both of the environmentally-friendly property and the excellent printability which is the same level as before or more.

A pigment of the present invention is used for coloring a medium in a wet state or a dry state. As for the pigment aqueous suspending solution of C. I. pigment red 57:1 produced by the process of the present invention, in which the total content of 3-hydroxy-2-naphthoic acid and a metal salt thereof is 2,500 ppm or less as converted into the 3-hydroxy-2-naphthoic acid, wet states of any moisture contents such as a pigment aqueous slurry, a pigment aqueous paste, and a press-cake can be obtained by subjecting the pigment to filtration, etc. so as to reduce the moisture.

In the present invention, a pigment aqueous paste refers to a pigment composition including calcium bis[2-(3-carboxy-2-hydroxynaphthylazo)-5-methylbenzenesulfonate] and water, in which the moisture content is within a range of 60 to 80 mass %.

As described above, a pigment aqueous paste can be used for the production of an offset ink subjected to flushing. A base ink for an offset ink can be prepared by kneading a varnish for an offset ink containing a binder resin and an organic solvent, and a pigment aqueous paste containing the pigment of the present invention, followed by flushing. As for a pigment of the present invention, 3-hydroxy-2-naphthoic acid and a metal salt thereof are not included, or the total content thereof is largely reduced. Therefore, the environmental load of drainage in the aforementioned flushing is significantly low. The base ink obtained in this manner is mixed with various diluents, additives, curing accelerator, etc., to thereby produce an offset ink.

The aforementioned pigment of the present invention in a wet state is dehydrated by conventional methods such as spray-dry, hot-air drying, far infrared rays drying, to thereby prepare a dry state. If necessary, crushing and classification can be further conducted to arrange the particle diameter and the distribution thereof, and then, the pigment may be provided for use.

Pigments of the present invention in a wet sate or a dry state can be used for conventional various applications including general-purpose applications such as printing inks including a lithography ink, a gravure printing ink, and a flexographic printing ink, coating agents, and colored plastic molded items; as well as high-tech applications such as electrostatic latent image developing toners, color filters, and inkjet recording aqueous inks.

FIG. 1 shows an example of the specific agitator exemplified as an optimal apparatus. Also, FIG. 1 shows an agitator used in Examples described below, wherein an upper blade, a middle blade and a broad bottom paddle 2 are fitted to a rotational axis 1 inside an agitating tank 5. In this FIG. 1, the broad bottom paddle 2 functions as the main agitating blade 20, and the middle blade and upper blade function as auxiliary agitating blades 30. This agitator includes the circular cylindrically shaped agitating tank 5, and a central axis, which is positioned within the center of the tank and is fitted sequentially with the upper blade, the middle blade and the lower bottom paddle 2. The positioning of these blades assumes that the direction of rotation of the central axis is in a clockwise direction when viewed from above.

In this configuration, the middle and upper agitating blades each have tips that are separated from the inner wall surface of the agitating tank 5, and a single blade arm is formed from a scraper 4, which is shaped like a letter "T" on its side, and a paddle 3 that is positioned adjacent to the scraper, with each agitating blade formed from a pair of these blade arms. Both of the agitating blades have the scrapers 4 close to the inner wall of the agitating tank 5, in an inclined arrangement that pushes the liquid up during rotation, and have the paddles 3 connected to the scrapers 4 in an inclined arrangement that pushes the liquid down during rotation. Moreover, vertically adjacent agitating blades are positioned so that the top edge of the lower agitating blade exhibits a phase lag of 30° relative to the bottom edge of the upper agitating blade in the opposite direction to the direction of rotation of the rotational axis 1. In FIG. 1, the fact that the middle blade appears larger than the upper blade is intended to reflect the phase difference between the two blades. Both the middle blade and the upper blade are designed such that the ratio of the total length of the agitating blade across the central axis relative to the internal diameter of the agitating tank 5 is 0.85.

As the agitating blades are rotated, the scrapers 4 promote the upward movement of the mixture of the diazo component and the coupler component inside the tank, thereby forming a rising liquid current. This rising liquid current changes to a descending liquid current near the central axis. During rotation of the agitating blades, the paddles 3 also promote the downward movement through the center of the tank of the mixture of the diazo component and the coupler component. Configurations in which both the paddles 3 and the scrapers 4 are inclined exhibit superior mixing properties to configurations in which both the paddles 3 and the scrapers 4 are vertical. Moreover, in the apparatus shown in FIG. 1, because the upper blade and the middle blade are arranged with a phase lag therebetween, the mixing properties can be improved compared with the case where agitating is conducted using only a single auxiliary agitating blade.

Furthermore, in the bottom paddle 2 at the lower point, the tips of the paddles close to the tank inner wall surface are both bent 45° in the opposite direction to the direction of rotation, thereby reducing the resistance accompanying the agitating. The wide paddle 2 prevents the mixture of the diazo component and the coupler component from accumulating in the lower regions of the agitating tank.

In the agitating tank, a flow pattern is formed in which the mixture of the diazo component and the coupler component in the bottom portion of the tank that is stirred by the bottom paddle 2 is pushed up the tank by the actions of the scrapers 4 of the middle blade and the scrapers 4 of the upper blade, whereas the mixture of the diazo component and the coupler component in the upper portion of the tank is pushed down by the paddles 3 of the upper blade and the paddles 3 of the middle blade, and as a result, the mixing of the mixture within the tank is enhanced, and the coupling reaction becomes smoother and more uniform.

EXAMPLES

A description of specifics of the present invention is provided below using a series of Examples. In the following description, unless stated otherwise, "parts" and "%" refer to mass-referenced values.

Measurement Device for Liquid Chromatography Mass Spectrometry:

Liquid chromatography mass spectrometry device HP1100 manufactured by Yokogawa Analytical Systems Co., Ltd. was used.

Conditions for Liquid Chromatography Mass Spectrometry:

30 mM ammonium acetate aqueous solution and acetonitrile were used as eluants, and ODS column was used as a column.

Quantitative Analysis Method of 3-hydroxy-2-naphthoic Acid (BON Acid) in Pigment:

100 mg of the standard sample were weighed with the 50 mL volumetric flask, and dimethylsulfoxide (DMSO) was added thereto so as to adjust the constant volume. The flask was tightly stoppered, and the solution was dissolved by the ultrasonic dispersing machine (manufactured by KAIJO Corporation, Model: C-4711) for 1 hour. This solution was appropriately diluted to prepare the solution samples for the calibration curve.

The above-prepared solution samples with various contents for the calibration curve are injected into the LC measurement device equipped with the aforementioned column and using the aforementioned eluants, which was prepared separately from the Liquid chromatography mass spectrometry device. Then, the peak of 3-hydroxy-2-naphthoic acid (BON acid) was detected at the retention time (Rt.) of 12.3 min, and by measuring the integration value of the peak area of the each solution sample, the calibration curve was preliminarily made for the quantity of the 3-hydroxy-2-naphthoic acid (BON acid).

The powder pigment produced by Examples described below was prepared, 5 mg thereof was precisely weighed, and the liquid sample was prepared in the same manner as the aforementioned.

This liquid sample was injected into the aforementioned LC measurement device under the same conditions as the aforementioned, and the content (ppm) of 3-hydroxy-2-naphthoic acid (BON acid) in the powder pigment was calculated by an absolute calibration method.

Example 1

34.80 parts of 4-aminotoluene-3-sulfonic acid (purity: 98.00%) was dispersed in 50 parts of water, 22.1 parts of 35% hydrochloric acid was added, ice and water were added, and with the temperature held at 0° C., 32.4 parts of a 40% aqueous solution of sodium nitrite was added in a single batch, thereby yielding 650 parts of a suspension containing a diazo component. Next, 34.98 parts of 3-hydroxy-2-naphthoic acid (purity: 98.50%) was dispersed in 400 parts of 50° C. water, 69 parts of a 25% aqueous solution of caustic soda was added and dissolved, and ice and water were then added, thus forming 980 parts of a 10° C. aqueous solution containing a coupler component.

The total quantity of this aqueous solution containing the coupler component was placed inside a circular cylindrically shaped agitating tank 5 with an internal capacity of 2 liters, a rotational axis 1 fitted with each of the agitating blades shown in FIG. 1 was positioned within the center of the agitating tank 5, and the rotational axis 1 was then fixed to a motor, thereby completing the setup of the agitator. Subsequently, the rotational axis 1 was rotated at a rotational rate of 100 rpm, and with the aqueous solution containing the coupler component undergoing constant agitating, the total quantity of the aforementioned suspension containing the diazo component was added in a single batch. The reaction temperature was maintained at 10° C. to 15° C. After 10 minutes, completion of the coupling reaction was confirmed using the H acid color test described below. Subsequently, 147 parts of an aqueous solution of a 10% disproportionated rosin sodium salt was added, and following agitating for a further 60 minutes, the pH was adjusted to 12.5, yielding an azo dye suspension.

In Example 1, the molar ratio of 4-aminotoluene-3-sulfonic acid: the 3-hydroxy-2-naphthoic acid was set to 1.000:1.005.

To the agitating tank 5 containing the azo dye suspension was added 80 parts of a 35% aqueous solution of calcium chloride, and the resulting mixture was stirred for 60 minutes to complete the laking reaction, thus yielding a suspension containing a C.I. Pigment 57:1. This suspension was aged by agitating for 90 minutes at a temperature of 80° C.

In both the laking step and the heating step, the rotational rate of the agitating blades was set to the same rate as that used in the coupling reaction, and the coupling reaction, the laking reaction and the heating were conducted consecutively in the same agitating tank 5, with no change of the tank.

Ice was then added, the liquid temperature was cooled to 60° C., and hydrochloric acid was used to adjust the pH to a value of 8.5. Subsequently, the product was filtered, washed with water, dried for 10 hours at 100° C., and then pulverized, yielding 93 parts of a dried pigment powder of the C.I. Pigment 57:1.

(H Acid Color Test)

A dilute aqueous solution of sodium hydroxide containing 1-amino-8-naphthol-3,5-disulfonic acid (H acid) was used as the color test reagent (the reagent for coloring). The point where no coloring occurred upon reaction with the coupling reaction liquid was taken as the end point of the coupling reaction.

Example 2

With the exception of setting the molar ratio of 4-aminotoluene-3-sulfonic acid: 3-hydroxy-2-naphthoic acid (molar ratio) to 1.000:1.002, production was conducted in the same manner as Example 1, yielding 93 parts of a dried pigment powder.

Example 3

With the exception of setting the molar ratio of 4-aminotoluene-3-sulfonic acid: 3-hydroxy-2-naphthoic acid to 1.000:1.003, production was conducted in the same manner as Example 1, yielding 93 parts of a dried pigment powder.

Comparative Example 1

The molar ratio of 4-aminotoluene-3-sulfonic acid: 3-hydroxy-2-naphthoic acid was set to 1.000:1.005, and a suspension containing a diazo component and an aqueous solution containing a coupler component were prepared. The aqueous solution containing the coupler component was added into a circular cylindrically shaped reaction apparatus with an internal capacity of 2 liters and the agitating blades shown in FIG. 2, which was similar to the one in Example 1, and the suspension containing the diazo component was then added thereto while the agitating blades were rotated at a rotational rate of 300 rpm. The reaction temperature was maintained at 10° C. to 15° C. After 60 minutes, the coloring was conducted using the H acid color test, 147 parts of an aqueous solution of a 10% disproportionated rosin sodium salt was added without completion of the coupling reaction, and following agitating for a further 60 minutes, the pH was adjusted to 12.5, yielding an azo dye suspension.

The laking and heating were conducted using this azo dye suspension in the same manner as Example 1, yielding 92 parts of a dried pigment powder of the C.I. Pigment 57:1.

Figure 2:
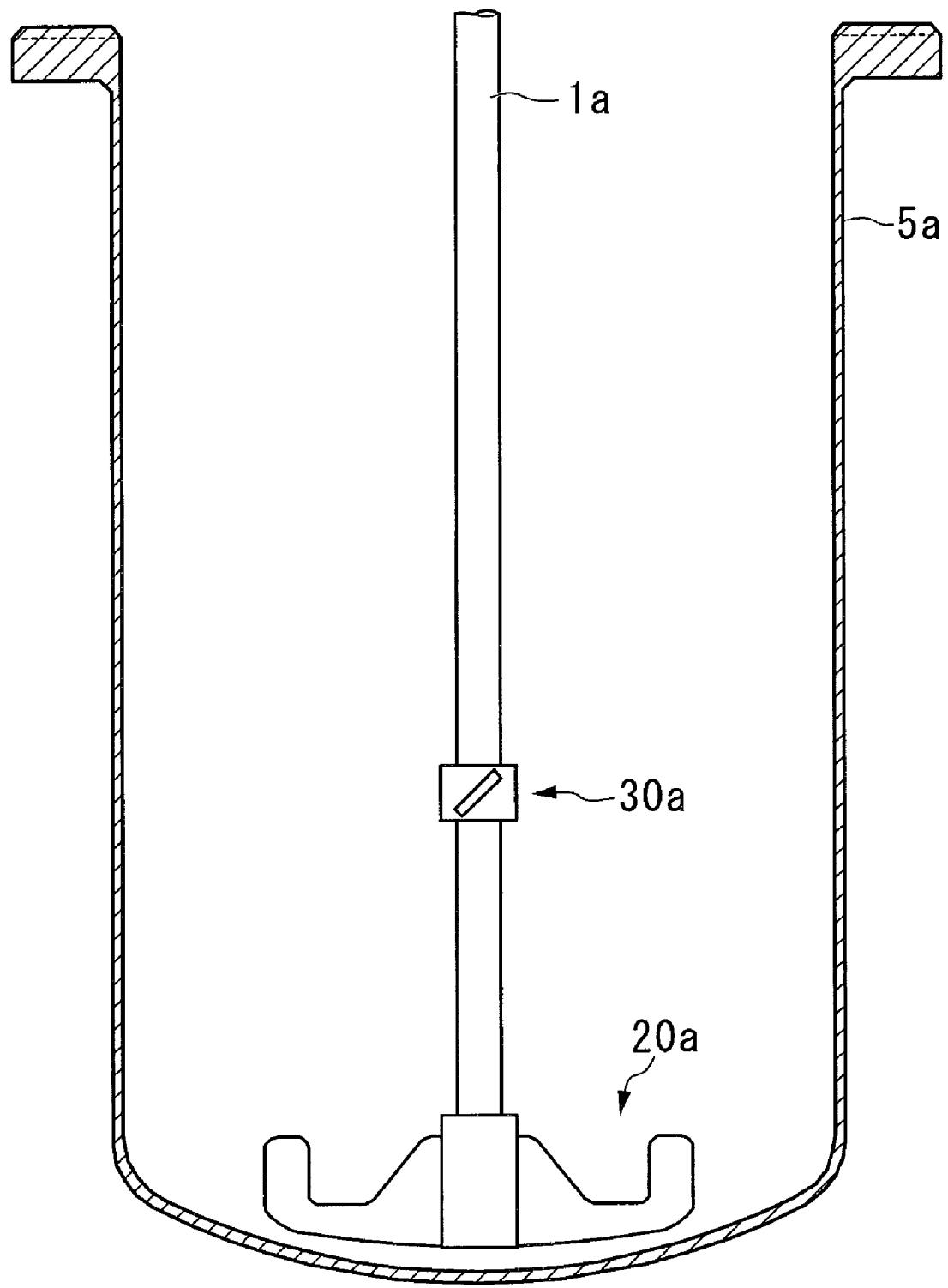
FIG. 2 is a side view of an agitating used in Comparative Example 1.

Herein, FIG. 2 represents the agitator in which the rotational axis 1a fitted with the lower blade made of the paddle blade 20a and the upper blade made of the propeller blade 30a with the same center and diameter as the lower blade is placed inside the agitating tank 5a. Although cannot be directly shown in FIG. 2 because the phase lag between the paddle blade 20a and the propeller blade 30a is 90°, the propeller blade 30a has a pair of propellers in the upward direction and the downward direction of the drawing, and these propellers are fixed so that they become straight when viewed from above, and can be rotated around the rotational axis 1a. These propellers are inclined so as to push liquid up during rotation.

Each of the diazotization ratios of the 4-aminotoluene-3-sulfonic acid in Examples 1 to 3 and Comparative Example 1 was within a range of 99.0% to 99.2%.

The pigment slurries prior to drying and after washing with water in Examples 1 to 3 and Comparative Example 1 were used as samples, and using liquid chromatography mass spectrometry, the reaction ratios of 3-hydroxy-2-naphthoic acid were calculated from the ratio of the consumed 3-hydroxy-2-naphthoic acid/the supplied 3-hydroxy-2-naphthoic acid.

Table 1 shows all the conditions of Examples 1 to 3 and Comparative Example 1. The molar ratio of supplied raw materials in Table 1 refers to the molar ratio of 4-aminotoluene-3-sulfonic acid: 3-hydroxy-2-naphthoic acid.

TABLE 1

| Table 1 | Molar Ratio of Supplied Raw Materials | Reaction Ratios of 3-hydroxy-2-naphthoic acid (%) |
|---|---|---|
| Example 1 | 1.000:1.005 | 98.51 |
| Example 2 | 1.000:1.002 | 98.80 |
| Example 3 | 1.000:1.003 | 98.70 |
| Comparative Example 1 | 1.000:1.005 | 95.52 |

In Examples 1 to 3, the reactions were conducted at a required power within a range from 0.1 to 0.9 kW/m$^3$ for a period of 5 to 30 minutes, and the energy consumption required for the coupling reaction was able to be suppressed at a lower level than that in Comparative Example 1.

Moreover, the dried pigment powders obtained in Examples 1 to 3 and Comparative Example 1 were used as samples, and using liquid chromatography mass spectrometry, the contents of 3-hydroxy-2-naphthoic acid and metal salts thereof were measured, and converted into 3-hydroxy-2-naphthoic acid. The results are shown in Table 2. As described above, it is preferable that the total content of 3-hydroxy-2-naphthoic acid and metal salts thereof be 2,500 ppm or less as converted into the 3-hydroxy-2-naphthoic acid, and be as close to 0 ppm as possible.

TABLE 1

| Table 2 | Contents of 3-hydroxy-2-naphthoic Acid and Metal Salts Thereof |
| --- | --- |
| Example 1 | 1908 |
| Example 2 | 798 |
| Example 3 | 1210 |
| Comparative Example 1 | 5706 |

The contents of 3-hydroxy-2-naphthoic acid and metal salts thereof in Examples 1 to 3 were lower than that in Comparative Example 1.

Test Example 1

Mixtures containing 6 parts of the each pigment obtained in Examples 1 to 3 and Comparative Example 1, 39 parts of a planographic printing ink vehicle containing a rosin-modified phenolic resin, and 5 parts of light oil were dispersed at 40° C. and a compression pressure of 15 bar using a triple roll mill manufactured by Buhler AG. In specific, firstly, the mixtures were dispersed for 5 minutes using double roll mill, and then passed 3 times through the triple roll mill, thus preparing a series of simulated planographic printing inks (planographic printing inks prior to inclusion of a drier).

(Tinting Strength)

Light-colored inks were prepared by mixing 0.2 parts of each of the simulated planographic printing inks with 2.0 parts of a white ink (titanium oxide). The tinting strength of each ink was determined using a Gretag apparatus (manufactured by GRETAG Limited). The tinting strength for the simulated planographic printing ink of Comparative Example 1 was deemed to be 100, and the corresponding numerical tinting strengths for the inks of Examples 1 and 2, and Comparative Example 1 are shown in Table 3.

Using each of the simulated planographic printing inks, the dispersibility of the pigment within the ink and the transparency of the ink in the printed image were evaluated. The results are shown in Table 3. The method and criteria used for evaluating the dispersibility and transparency are as described below.

(Dispersibility)

The dispersibility of each of the simulated planographic printing inks was evaluated using a grind gauge.

A: very good, B: good, C: fair, D: poor (Transparency)

Each of the simulated planographic printing inks was thinly spread on a substrate and dried so as to form a colored, dried film. Then, the transparency of the resulting colored image was evaluated visually.

A: very good, B: good, C: fair, D: poor

TABLE 3

| Table 3 | Tinting Strength | Transparency | Dispersibility |
| --- | --- | --- | --- |
| Example 1 | 100 | B | B |
| Example 2 | 100 | B | B |
| Example 3 | 100 | B | B |
| Comparative Example 1 | 98 | B | B |

As can be seen in Table 3, C. I. pigment red 57:1 of the present invention exhibited similar tinting strength, transparency and dispersibility to conventional inks, and the total content of 3-hydroxy-2-naphthoic acid and metal salts thereof, which was measured by quantitative analysis using liquid chromatography, at a lower level than that in conventional inks. Therefore, it is clear that safety of working environment in which a customer deals with C. I. pigment red 57:1 of the present invention is much high.

Moreover, as can be seen in Table 1, in each of the production methods of C. I. pigment red 57:1 of Examples, while the supplied quantity of 3-hydroxy-2-naphthoic acid of a coupler component was suppressed, the reaction ratio of 3-hydroxy-2-naphthoic acid was increased, and the energy consumption of the agitator was also largely suppressed.

Accordingly, it is clear that the pigment, which exhibits similar tinting strength, transparency and dispersibility to conventional inks and high safety of working environment in which a customer deals with it, is obtained at a lower energy consumption than before.

INDUSTRIAL APPLICABILITY

According to the present invention, the pigment, which exhibits similar tinting strength, transparency and dispersibility to conventional inks and high safety of working environment in which a customer deals with it, can be obtained at a lower energy consumption than before. Accordingly, the present invention is very useful industrially.

The invention claimed is:

1. A process for producing C. I. pigment red 57:1, comprising:
   conducting coupling of a diazonium salt of 4-aminotoluene-3-sulfonic acid and 3-hydroxy-2-naphthoic acid; and conducting laking with an inorganic calcium compound, wherein
   a molar ratio of the 4-aminotoluene-3-sulfonic acid: the 3-hydroxy-2-naphthoic acid is set within a range of 1.000:1.000 to 1.000:1.006, and
   the coupling is conducted by agitating so that a reaction ratio of the 3-hydroxy-2-naphthoic acid reaches 98.45% or more.

2. A process for producing C. I. pigment red 57:1 according to claim 1, wherein the agitating is conducted within an agitator that has a rotational axis fitted with a main agitating blade and an auxiliary agitating blade inside an agitating tank, and
   in the agitator,
   the main agitating blade has tips that are separated from an inner wall surface of the agitating tank so as to generate a rising liquid current during agitating, and is positioned at a lowest point on a central axis,
   whereas the auxiliary agitating blade has scrapers close to an inner wall of the agitating tank that are either arranged vertically, or inclined so as to push liquid up during rotation, and has paddles that are connected to said scrapers and are either arranged vertically, or inclined so as to push liquid down during rotation, and
   vertically adjacent agitating blades are positioned so that a top edge of a lower agitating blade exhibits a phase lag relative to a bottom edge of an upper agitating blade in an opposite direction to a direction of rotation of the rotational axis.

* * * * *